United States Patent [19]

Macpherson et al.

[11] Patent Number: 5,103,690
[45] Date of Patent: Apr. 14, 1992

[54] PART-TIME ALL WHEEL DRIVE SYSTEM

[76] Inventors: Roger Macpherson, 185 Pleasant Way, Penfield, N.Y. 14526; Peter R. Geib, 15 Warwick Dr., Fairport, N.Y. 14450

[21] Appl. No.: 530,238

[22] Filed: May 30, 1990

[51] Int. Cl.$^5$ .................. F16H 37/06; B60K 17/34
[52] U.S. Cl. ................ 74/665 GB; 74/665 GC; 180/233; 180/247; 192/50; 464/93
[58] Field of Search .......... 180/233, 245, 246, 247; 192/44, 50; 464/87, 92, 93, 94, 95; 74/665 F, 665 GC, 665 GD, 665 G, 665 GB

[56] References Cited

U.S. PATENT DOCUMENTS

| | | | |
|---|---|---|---|
| 547,205 | 10/1895 | Flansburg | 180/233 |
| 1,218,613 | 3/1917 | Adler | |
| 1,706,867 | 3/1929 | Andrade | |
| 1,823,092 | 9/1931 | de Lavaud | |
| 2,191,763 | 2/1940 | La Casse | |
| 2,481,066 | 9/1949 | Bagge | 74/650 |
| 2,802,539 | 8/1957 | Westfall | 74/665 GC |
| 3,111,043 | 11/1963 | Panhard | 74/650 |
| 3,124,972 | 3/1964 | Seliger et al. | 74/650 |
| 3,310,997 | 3/1967 | Biddle | 84/650 |
| 3,447,396 | 6/1969 | Seliger | 74/650 |
| 3,581,597 | 6/1971 | Reiersgaard | 74/650 |
| 3,798,924 | 3/1974 | Downey | 464/92 |
| 3,888,137 | 6/1975 | Brieten | 74/650 |
| 3,908,401 | 9/1975 | Harbage | 464/92 X |
| 3,935,753 | 2/1976 | Williams | 74/650 |
| 4,031,779 | 6/1977 | Braune | 74/650 |
| 4,076,108 | 2/1978 | Fogelberg | 192/44 X |
| 4,228,664 | 10/1980 | McCoy | 464/92 |
| 4,434,878 | 3/1984 | Okubo | 192/48.92 |
| 4,509,388 | 4/1985 | Tsiriggakis | 74/650 |
| 4,860,869 | 8/1989 | Hall, III | 192/93 A |
| 4,867,009 | 9/1989 | Hudson | 192/50 X |
| 5,036,939 | 8/1991 | Johnson et al. | 180/233 |

FOREIGN PATENT DOCUMENTS 3244609  6/1984  Fed. Rep. of Germany ...... 180/233
1051513  12/1966  United Kingdom .

OTHER PUBLICATIONS

*Popular Science*, Dec. 1986, pp. 68–69.

*Primary Examiner*—Leslie J. Braun
*Assistant Examiner*—Benjamin Levi
*Attorney, Agent, or Firm*—Eugene Stephens & Associates

[57] ABSTRACT

An all wheel drive system for a motor vehicle is normally set up to operate in a two wheel drive mode except in vehicle operating situations where increased traction is desired. A drive shaft of a drive line is connected to front and rear axles through respective speed adjusters. A front speed adjuster provides for transmitting a rotational speed to the front drive axle that is slower than a rotational speed transmitted by the rear speed adjuster to the rear drive axle. At least one overrunning clutch is interposed in the drive line to a pair of front drive wheels for permitting the front drive wheels to be rotated out of engagement with the drive line by motion of the vehicle.

29 Claims, 5 Drawing Sheets

PART-TIME ALL WHEEL DRIVE SYSTEM

TECHNICAL FIELD

Our invention relates to the field of automotive drive trains and, in particular, to part-time all wheel drives with enhanced performance capabilities.

DESCRIPTION OF THE RELATED ART

There are three main types of automotive drive systems, namely, front wheel drive, rear wheel drive, and all wheel drive. The systems are distinguished by the delivery of power to different combinations of drive wheels. However, in addition to delivering power to a particular combination of drive wheels (e.g., the two rear wheels), the drive systems must permit the respectively driven wheels to rotate at different speeds. In a turn, for example, the outside wheels must rotate faster than the inside drive wheels, and the front wheels must rotate faster than the rear drive wheels.

Typically, the inside and outside drive wheels of a two wheel drive system (i.e., front or rear wheel drive) are interconnected by a differential mechanism which permits the opposite drive wheels to rotate at different speeds while delivering an approximately equal amount of drive torque to each. However, this characteristic of delivering approximately equal amounts of torque to the drive wheels independently of their relative rotational speed significantly limits the total amount of torque which can be delivered to the drive wheels when one of the drive wheels loses traction. For example, if either drive wheel does not have sufficient traction to sustain its portion of the drive torque, the amount of drive torque which can be delivered to the other drive wheel is similarly reduced.

Many attempts have been made to overcome this problem by modifying differential performance to support unequal distributions of torque between the drive wheels. Generally, the unequal distributions of torque are supported by resisting any differential rotation between drive wheels. For example, limited slip differentials modify a conventional differential by including a frictional clutch mechanism which resists any relative rotation between the drive wheels. In other words, unequal torque distributions between drive wheels are supported by sacrificing some of the differential capacity to support unequal rotational speeds between the drive wheels.

It is also known to replace conventional differentials with a pair of roller clutches that provide separate paths for transmitting power to the drive wheels. For example, U.S. Pat. No. 3,124,972 to J. M. Seliger et al. discloses a pair of roller clutches which are carried within the space of a conventional differential housing. Both roller clutches may be engaged for connecting respective drive axles to the housing, and either roller clutch may be disengaged to permit one of the drive axles to rotate faster than the housing. When both drive wheels rotate at the same speed, drive torque is divided between the drive wheels in accordance with their respective traction conditions. Otherwise, all of the drive torque is delivered to the slower rotating drive wheel. In other words, the roller clutches provide for supporting unequal distributions of torque between drive wheels without restricting their relative rotation. However, the distribution of drive torque between drive wheels is affected by both traction conditions and relative rotation between the drive wheels.

In recent years, all wheel drives have gained popularity as a way to enhance traction capability. Instead of dividing drive power between only two wheels of a vehicle, all wheel drives divided power among all four wheels. As a result, each wheel is required to support a smaller portion of the total drive torque. However, in addition to delivering power to both a front and rear drive axle, all wheel drives must also permit the two axles to rotate at different speeds. Accordingly, drive shafts to the front and rear axles are often interconnected by a differential mechanism which permits the front and rear drive axles to rotate at different speeds while delivering approximately equal amounts of torque to them. Part-time all wheel drive systems are also common which permit a vehicle operator to selectively connect a second drive axle to the vehicle drive line when adverse traction conditions are encountered.

Both of these known ways to interconnect the front and rear axles of all wheel drive vehicles experience significant problems. For example, if both the front and rear axles are permanently interconnected by a differential mechanism, more power is expended by the drive train delivering power to two axles in comparison to delivering power to only one of the axles. Ordinarily, adequate traction is available from a single pair of drive wheels to support the delivery of drive power, and the further division of drive power among more than two wheels is not necessary. Significant power losses and reduced gas mileage occur as a result of the unnecessary transmission of drive power to additional wheels.

Part-time all wheel drives rely on operator judgment to select between two and all wheel drive modes. Drive shafts to the front and rear drive axles are generally coupled together in the all wheel drive mode, thereby preventing the two axles from rotating at different speeds. The drive wheels of one or the other axles tend to skid in response to courses of travel which require the front and rear axles to rotate at different speeds. Accordingly, significant power losses occur in the all wheel drive mode from the tendency of one of the axles to brake the vehicle. Power is delivered to either the front or rear axle depending upon whichever axle is required to rotate slower to maintain traction. This makes for unpredictable changes in vehicle handling characteristics by switching between effective front or rear wheel drive. Further, part-time all wheel drive vehicles experience the same loss of traction as two wheel drive vehicles until the all wheel drive mode is engaged.

It is also known to replace a conventional differential interconnecting the front and rear drive axles with a limited slip differential to further enhance traction capabilities of all wheel drive vehicles. The limited slip differentials support unequal distributions of torque between drive axles, but they also resist relative rotation between the axles. Accordingly, the same power losses occur from permanently driving an additional axle, and drive torque is unpredictably divided between the front and rear axles in response to situations requiring the drive axles to rotate at different speeds.

SUMMARY OF THE INVENTION

Our invention satisfies the need for improved vehicle traction without adversely affecting other characteristics of vehicle performance including handling and fuel economy. In particular, our all wheel drive system overcomes the problems of prior all wheel drive systems by normally operating in a two wheel drive mode except in predetermined vehicle operating situations in which increased traction is desirable.

Our part-time all wheel drive system is preferably set up to normally operate in a rear wheel drive mode. However, when additional traction is needed, our all wheel drive system also delivers drive (i.e., engine) power to the front wheels. For example, if at least one of the rear drive wheels uses up its available traction and starts to slip, drive power is automatically delivered to the front drive wheels. An operative connection between the front and rear drive wheels also limits the amount of wheel slip.

Our part-time all wheel drive system may also be set up to deliver drive power to both the front and rear drive wheels when the power is first applied to start a vehicle in motion. Available traction of a drive wheel may be exhausted in one of two ways, namely, by reducing available traction with respect to drive torque imparted by the drive wheel or by increasing the drive torque imparted by the drive wheel with respect to the available traction. Accordingly, the most likely occurrence of wheel slip is associated with the application of torque in "low gear" required to first urge a vehicle into motion. The provision of initially delivering drive power to both the front and rear wheels helps to prevent the most likely occurrence of wheel slip and to automatically achieve the most important objective of a traction aiding system which is to prevent a vehicle from becoming "stuck" in place. Once in motion, less drive torque is required to sustain the vehicle's motion; and at faster vehicle speeds, drive torque is reduced by an accompanying shift in gear ratio within the vehicle's transmission.

Following a predetermined amount of initial rotation of the front drive wheels under power, the further motion of the vehicle is used to disengage the front drive wheels, leaving the further delivery of drive power to the rear wheels alone. For example, the front drive wheels may be initially engaged for only a part of one revolution. Of course, should the rear wheels slip, a portion of the drive power remains at the front wheels.

One version of our all wheel drive system features a drive shaft that is rotatively connected to both a front and a rear drive axle by respective speed adjusters. The speed adjusters may be of a conventional type having pinion and ring gear members providing for transmitting power between the drive shaft and drive axles. However, in accordance with our invention, relative rotational speed transmitted by the front speed adjuster is slower than the relative rotational speed transmitted by the rear speed adjuster.

The different rotational speeds transmitted to the drive axles have the effect of rotating the front drive axle under drive power slower than the rear drive axle. However, at least the front drive wheels are operatively connected to their respective axle by overrunning clutches that enable the front drive wheels to rotate out of engagement with the slower rotating front axle. Additional overrunning clutches connecting the rear drive wheels to their respective axle may be used in place of a differential to prevent either rear wheel from slipping independently of the other rear drive wheel. However, if both rear wheels begin to slip, the speed at which the front axle is driven increases with respect to the rotational speed of the front drive wheels, and the overrunning clutches connecting the front wheels are engaged for delivering engine power to the front wheels.

The amount of slipping required to engage the front drive wheels is limited by the rotational speed difference between the axles provided by speed ratios of the front and rear speed adjusters. However, the faster the vehicle is being driven, the more wheel slip is required to increase the speed of the front axle to the rotational speed of the front drive wheels. This feature discourages the engagement of the front drive wheels at a time in which additional driving traction is least required. Conversely, a smaller amount of rear wheel slippage is required to engage the front drive wheels at slower vehicle speeds. In fact, when drive power is first applied, imparting initial rotation to the drive shaft, both the front and rear drive wheels are momentarily engaged until the front wheels are rolled out of engagement by motion of the vehicle. The amount of initial rotation required to disengage the front drive wheels may be controlled by an elastomeric coupling interposed in the drive line to the rear wheels. However, if the rear wheels slip when first starting the vehicle in motion, the front wheels remain engaged until the rear wheels regain traction.

The overrunning clutches, which operatively connect the drive wheels and drive axles, are preferably designed as two-way roller clutches that include a camming member having a plurality of recesses formed in its peripheral surface and a roller retainer circumferentially supporting a plurality of rollers within the respective recesses in the camming member. The roller retainer, together with the plurality of rollers, is indexable between two limit positions. One of the limit positions enables engagement of the roller clutches in response to one direction of relative rotation between the respective drive axle and drive wheel and the other limit position enables engagement of the roller clutch in response to an opposite direction of the relative rotation.

Preferably, the roller retainers are spring biased into the first limit position enabling engagement of the roller clutches in response to forward drive rotation of the drive axles with respect to the drive wheels. However, the same limit position also enables disengagement of the roller clutches in response to forward rotation of the drive wheels with respect to the drive axles. In other words, the drive axles are engaged with their respective drive wheels for driving the vehicle in a forward direction unless the drive wheels are rotated on their own at a faster speed.

An externally controlled actuator may be connected to each roller clutch for indexing the roller retainer to the other limit position. The roller clutches function in the other limit position similar to the first limit position, but in reverse. That is, the drive wheels are engaged to be driven in reverse, but they are also allowed to rotate at any faster speed than they would otherwise be driven in reverse. The actuator may include an annular plate rotatively coupled to the roller retainer. The plate includes a plurality of vanes angularly arranged about its periphery in open communication with a fluid supply duct of a stationary hydraulic control housing. The supply duct directs a stream of fluid against the vanes of the annular plate for indexing the plate to the other limit position.

Another variation of our all wheel drive system uses only a single overrunning clutch that is located in the drive line to the front drive axle. Different rotational speeds are transmitted to the front and rear drive axles, but the drive wheels are connected to their respective axles in a conventional manner. Conventional differentials may also be used to rotatively interconnect separate portions of the drive axles supporting the respective drive wheels. The drive shaft is also divided into two halves (i.e., front and rear drive shafts) that are separately connected to an output shaft of a transmission. The single overrunning clutch is used to rotatively connect the transmission output shaft to the front drive shaft.

During normal vehicle operating situations, the relative rotational speeds transmitted to the front and rear drive axles enable the rear drive wheels to propel the vehicle at a speed which rotates the front wheels and, therethrough, the front drive shaft faster than the transmission output shaft. However, if one of the rear drive wheels slips, the rotational speed of the transmission output shaft increases which respect to vehicle speed. Once the speed of the output shaft reaches the speed of the front drive shaft, the overrunning clutch engages and drive power is also delivered to the front drive wheels.

The single overrunning clutch is preferably designed as a two-way roller clutch similar to the roller clutches described in the preceding variation of our all wheel drive system. However, it would also be possible to substitute other types of overrunning clutches or other mechanisms for performing a similar function. The same interaxle functions of the two front overrunning clutches of the preceding variation are incorporated into the single overrunning clutch of the present variation. An elastomeric coupling may also be used to connect the transmission output shaft to the rear drive shaft to assure that a predetermined amount of initial drive rotation is imparted to the front drive wheels when first moving the vehicle from rest. The single overrunning clutch, together with the differing rotational speeds transmitted to the front and rear drive axles, may be easily incorporated into a conventional all wheel drive line. However, both of the above-described variations of our all wheel drive system replace conventional transfer mechanisms or center differentials located between the front and rear drive shafts.

Although the drive train to the front drive wheels continues to rotate during the rear wheel drive operating mode, significant savings from power losses in the drive train are realized by eliminating the transmission of unnecessary torque to the front drive wheels. In other words, power losses to the front drive wheels are reduced by virtually eliminating the transmission of power through the drive line to the front drive wheels. However, in the less frequent situations in which additional traction is needed, the front wheels are automatically engaged to help propel the vehicle.

The difference between the relative rotational speeds transmitted to the front and rear drive axles is selected large enough so that ordinary variations in the rotational speeds between the front and rear axles do not engage the front drive wheels. On most vehicles, the rear drive wheels rotate, on average, slower through turns than the front drive wheels, and therefore, no relative speed reduction to the front drive wheels is necessary to accommodate vehicle turning situations. However, ordinary variations in wheel diameters between the front and rear drive wheels can increase the average rotational speed of the rear wheels with respect the the front wheels. Accordingly, the rotational speed transmitted to the front drive axle is reduced with respect to the rotational speed transmitted to the rear axle by an amount that exceeds the relative rotational effects of ordinary variations in wheel diameters. This feature enables our part-time all wheel drive system to remain in a rear wheel drive mode despite ordinary increases in speed of the rear drive wheels with respect to the front drive wheels.

Of course, since the relative sizes of the front and rear drive wheels affect the rotational speeds at which they are driven under drive power, it would also be possible to change the diameters of the rear drive wheels with respect to the front drive wheels to have an effect similar to transmitting unequal rotational speeds to the front and rear drive axles. In fact, the transmission of different rotational speeds to the drive axles is understood in the context of the present invention as being relative to the respective rotational speeds of the front and rear drive wheels that are required to maintain good traction.

Thus, our part-time all wheel drive system may be arranged in a variety of embodiments to provide a number of significant advantages over prior drive systems. Our drive system is normally engaged in a two wheel drive mode which results in a significant reduction in power losses and improves gas mileage. However, in situations where additional traction is desirable, i.e., when first imparting motion to a vehicle at rest or when available traction of at least one of the two drive wheels is exhausted, our drive system automatically engages the remaining two drive wheels to provide the desired increase in traction. During other vehicle operating situations which may require the rear wheels to rotate faster than the front wheels, our drive system remains in the two wheel drive mode to assure more consistent and predictable vehicle handling characteristics.

These many advantages may be accomplished with a limited amount of redesign of conventional all wheel drive lines. In fact, conventional transfer cases or center differentials between the drive axles are no longer required and may be replaced with either one or a pair of overrunning clutches resulting in a significant reduction in the overall weight of the drive line.

DRAWINGS

DETAILED DESCRIPTION

Figure 1:
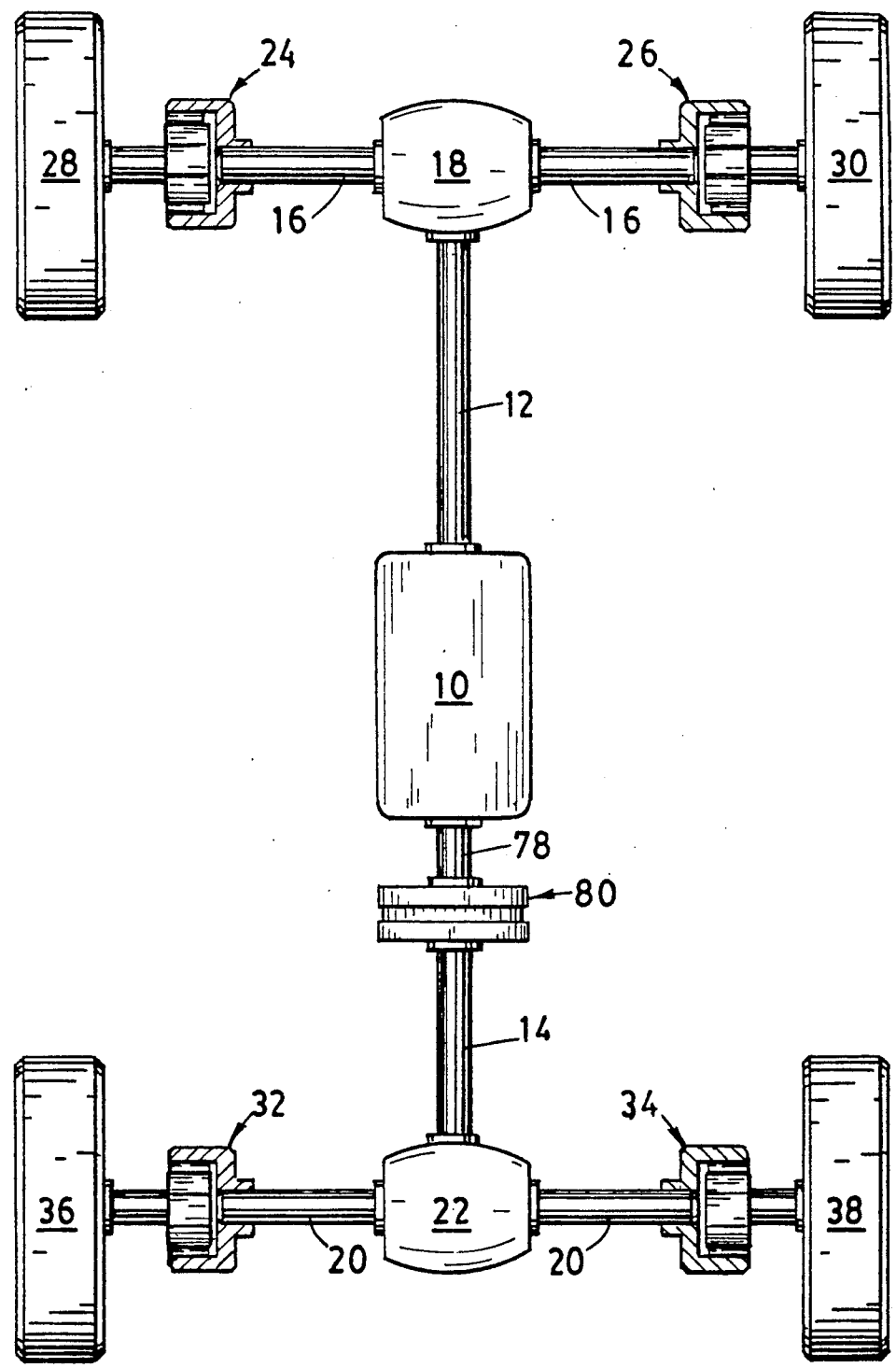
FIG. 1 is a schematic layout of one embodiment of our part-time all wheel drive system.
Figure 2:
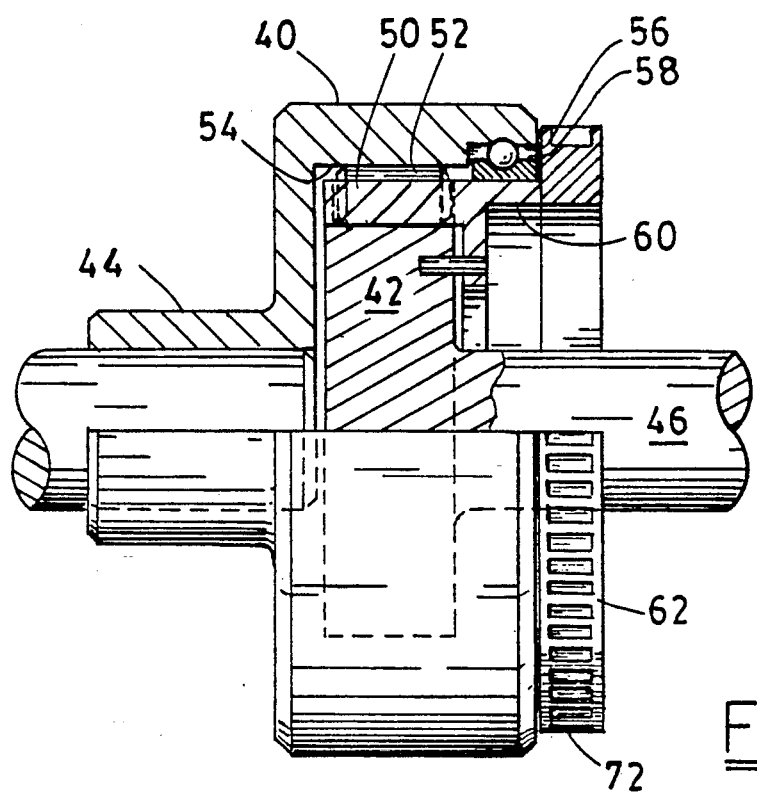
FIG. 2 is a view taken partly in cross section of an exemplary roller clutch that may be used with our invention.

One embodiment of our all wheel drive system is depicted schematically in FIG. 1. The drive line of our system includes a transmission 10 which is rotatively connected to both a front drive shaft 12 and a rear drive shaft 14. The front drive shaft 12 is rotatively connected to front drive axle 16 through a front speed adjuster 18. Similarly, rear drive shaft 14 is rotatively connected to rear drive axle 20 through rear speed adjuster 22. Both speed adjusters 18 and 22 may be arranged as conventional bevel or hypoid gear pairs having respective pinion members connected to the drive shafts and respective ring gear members connected to the drive axles. However, the respective gear ratios of the gear pairs of the front and rear speed adjusters are selected so that a speed reduction to the front drive axle is made slightly larger than a speed reduction to the rear drive axle. As a result, the rear drive axle is driven slightly faster than the front drive axle.

A pair of front roller clutches 24 and 26 operatively connect front drive axle 16 to respective front drive wheels 28 and 30. Similarly, rear drive axle 20 is operatively connected to rear drive wheels 36 and 38 by respective rear roller clutches 32 and 34. The front and rear roller clutches are engageable for rotatively coupling the respective front and rear drive wheels to their associated drive axles and are disengageable for permitting relative rotation between the respective drive wheels and drive axles.

The four roller clutches 24, 26, 32, and 34 cooperate to replace the rotational functions of front, rear and center differentials. For example, the two front roller clutches 24 and 26 permit relative rotation between the front drive wheels 28 and 30 and between the front and rear drive axles 16 and 20. The two rear roller clutches 32 and 34 permit relative rotation between the two rear wheels 36 and 38. Although the front and rear roller clutches are depicted along their respective axles between the speed adjusters and drive wheels, it would also be possible to incorporate the respective front and rear roller clutches as part of the front and rear speed adjusters.

FIGS. 2 through 5 depict an exemplary roller clutch for use in our drive line. The depicted roller clutch includes an outer shell 40 and camming member 42 which are respectively coupled to first and second axle portions 44 and 46. First axle portion 44 is rotatively connected to one of the drive axles, and second axle portion 46 is rotatively connected to one of the drive wheels. Camming member 42 takes the form of a cam disk having a plurality of recesses 48 formed in its peripheral surface. Roller retainer 50 circumferentially supports a plurality of rollers 52 within the recesses 48 of the cam disk.

Outer shell 40 includes two inner bearing races 54 and 56. The bearing race 54 cooperates with cam disk 42 and rollers 52 for engaging and disengaging the roller clutch. The bearing race 56 provides a mounting surface for bearing 58 that rotatively supports roller retainer 50 within outer shell 40. The bearing 58 is also mounted about extended portion 60 of the roller retainer which connects an actuator plate 62 to the roller retainer. Arcuate slots 64 are formed in plate 62 which receive pins 63 that project from an end face of cam disk 42. The pins 63 and slots 64 are dimensioned to permit a predetermined amount of relative rotation between roller retainer 50 and cam disk 42.

Figure 3:
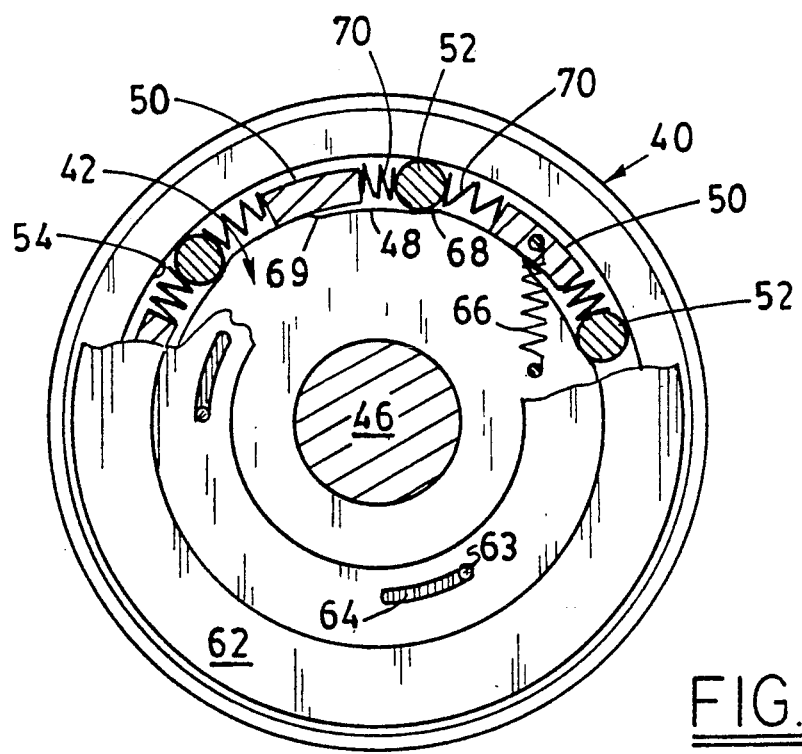
FIG. 3 is a cross-sectional view of the roller clutch of FIG. 2 taken along its axis of rotation.
Figure 4:
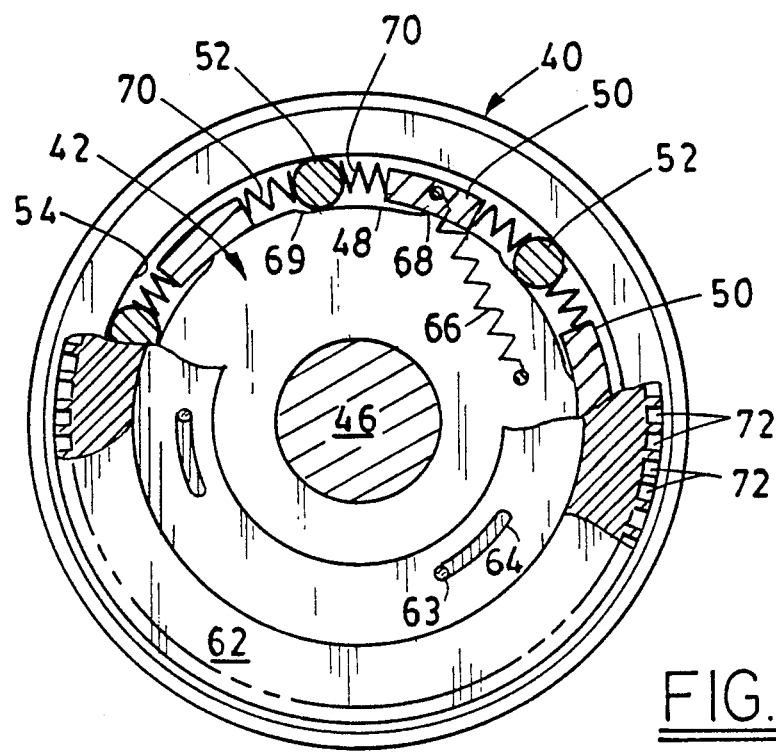
FIG. 4 is a view similar to FIG. 3 showing the roller clutch indexed to a limit position opposite to the limit position shown in FIG. 3.

The pins 63 also provide a mounting post for springs 66 that urge roller retainer 50 into a first limit position shown in FIG. 3. At the first limit position, rollers 52 are captured between ramp surfaces 68 of the cam disk recesses and bearing race 54 of the outer shell. Clockwise rotation of the outer shell with respect to the cam disk engages the roller clutch by locking together the outer shell, rollers and cam disk for transmitting power between the first and second axle portions 44 and 46. However, rollers 52 are mounted within roller retainer 50 between compression springs 70 or similar resilient means that permit the rollers to disengage the roller clutch in response to clockwise rotation of the cam disk with respect to the outer shell.

Figure 5:
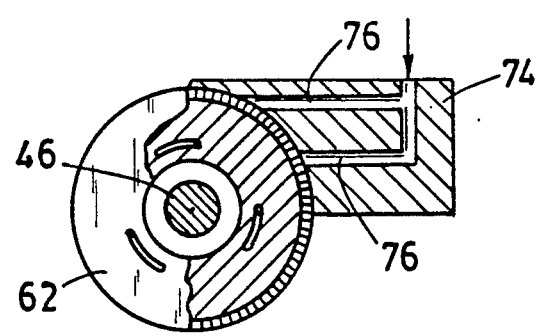
FIG. 5 is another axial view of our roller clutch showing a cross-sectional view of a stationary hydraulic control housing for indexing the roller clutch to the limit position shown in FIG. 4.

The actuator plate 62 has formed in its peripheral surface vanes 72 that cooperate with a stationary hydraulic control housing 74 of FIG. 5 for indexing the roller retainer to a second limit position. Hydraulic control housing 74 includes at least one supply duct 76 for delivering a supply of pressurized fluid against vanes 72 of the actuator plate. Fluid discharged from the supply duct 76 strikes the vaned actuator plate 62 tangentially and causes the plate, together with the roller retainer, to rotate counterclockwise with respect to cam disk 42 into the second limit position shown in FIG. 4. Of course, the amount of tangential force imparted against the actuator plate must be sufficient to overcome the force of spring 66 which urges the roller retainer into the first limit position.

At the second limit position, rollers 52 are captured between ramp surfaces 69 of the cam disk recesses and bearing race 54 of the outer shell. In contrast to the first limit position, counterclockwise rotation of the outer shell with respect to the cam disk engages the roller clutch, whereas counterclockwise rotation of the cam disk with respect to the outer shell disengages the roller clutch.

The above-described roller clutch defines a two-way roller clutch which is engageable at two limit positions. When such roller clutches are installed in the drive line of FIG. 1, the first limit position enables engagement of the roller clutches in response to forward drive rotation of the drive axles with respect to the drive wheels and enables disengagement of the roller clutches in response to forward rotation of the drive wheels with respect to the drive axles. The second limit position enables engagement of the roller clutches in response to reverse drive rotation of the drive axles with respect to the drive wheels and enables disengagement in response to reverse rotation of the drive wheels with respect to the drive axles. In other words, when the drive axles are urged to rotate under power faster than the rotational speed of the drive wheels, the roller clutches may be engaged at an appropriate limit position for propelling a vehicle. However, if any of the drive wheels are rotated by movement of the vehicle faster than their associated drive axle is being driven, the roller clutches may be disengaged at the same limit position to permit the faster rotation of the drive wheels.

Since the speed reduction to the rear drive axle 20 is less than the reduction to the front axle 16, at least one of the rear roller clutches 32 or 34 is ordinarily engaged by drive power. However, the larger reduction to the front axle ordinarily disengages both front roller clutches 24 and 26. In other words, the engagement of the rear wheels ordinarily propels the vehicle at a rate which rotates the front wheels faster than rate at which the front axle is rotated by drive power. Accordingly, unless the rear wheels slip at a rate which enables the front drive shaft to rotate the front axle at a rate at least equal to the speed at which the front wheels are rotated by vehicle movement, the front wheels remain disengaged from the drive line. Also, the difference between the speed ratios to the front and rear drive axles is selected so that the front drive wheels are not inadvertently engaged by ordinary variations in wheel diameters.

The difference in rotational speeds between the front and rear drives associated with the different speed reductions is also a function of the rotational speed of the drive shafts. For example, if the drive shafts are rotating very fast, the different speed ratios effect a large difference in rotational speeds between the drive axles. Accordingly, more slippage (i.e., a higher rate of slippage) at the rear wheels is required to engage the front drive wheels. However, if the drive shaft is rotating slower, less slippage is required to engage the front wheels. In fact, initial rotation of the drive shaft tends to engage both the front and rear drive wheels until the front wheels are rolled out of engagement by movement of the vehicle.

The drive line of FIG. 1 also includes an elastomeric coupling 80 that connects rear drive shaft 14 to an output shaft 78 of transmission 10. Compliance in the coupling reduces the amount of rotation which is transmitted to the rear drive wheels and enables the front drive wheels to remain engaged until further motion is imparted to the vehicle. Preferably, the front wheels remain engaged for only part of a revolution, but even such a short period of engagement is believed to help avoid the possibility of any initial slippage of the rear wheels.

Figure 6:
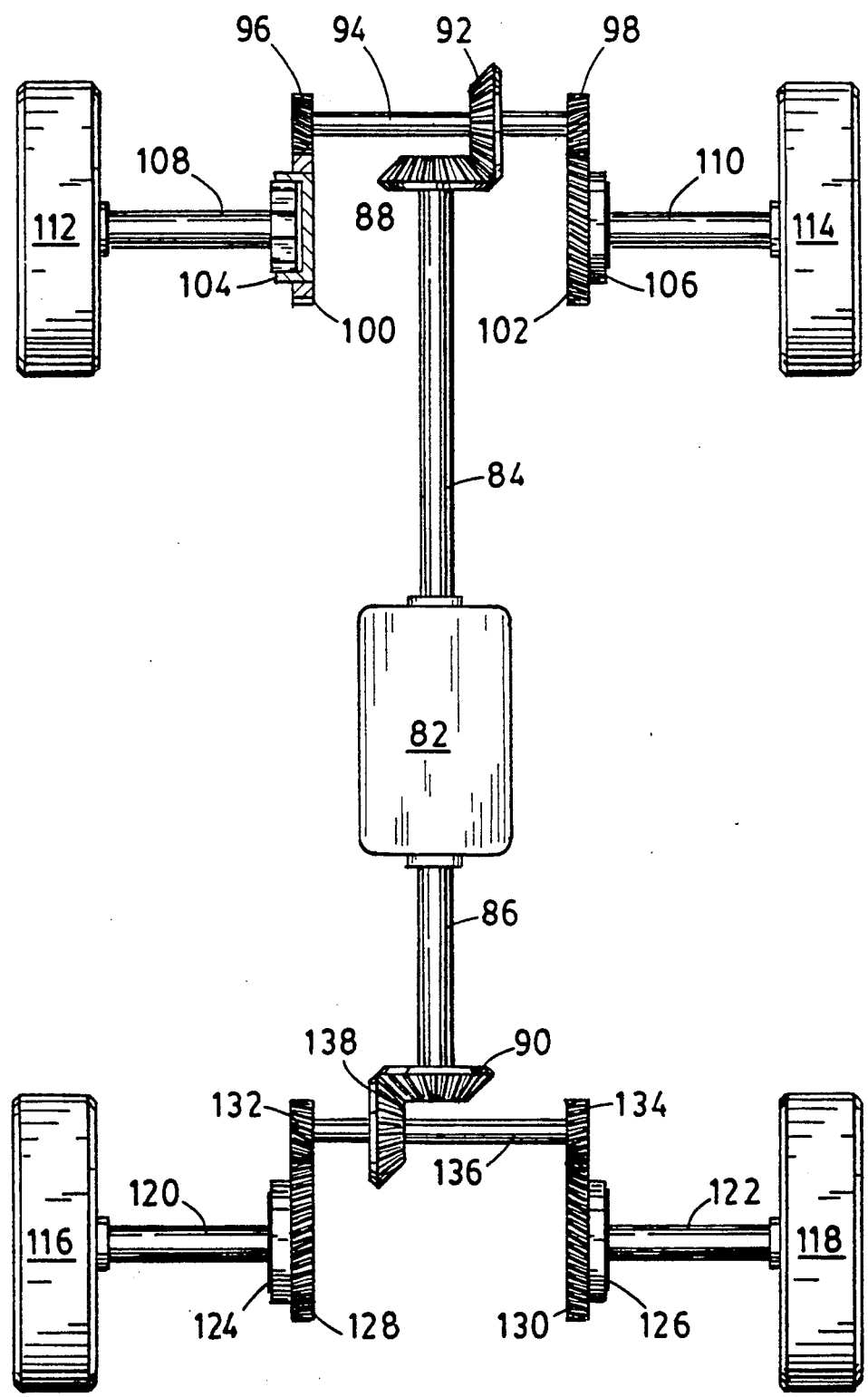
FIG. 6 is a more detailed depiction of the drive system shown schematically in FIG. 1.

A more detailed illustration of the drive line depicted in FIG. 1 is shown in FIG. 6. The drive line of FIG. 6 includes the commonly depicted features of a transmission 82 and front and rear drive shafts 84 and 86. The ends of the drive shafts terminate at respective bevel pinions 88 and 90. Bevel pinion 88 meshes with bevel gear 92 that drives idler shaft 94 carrying spur (or helical) pinions 96 and 98 at its ends. The spur pinions 96 and 98 drive respective spur gears 100 and 102. Roller clutches 104 and 106 are interposed between the respective spur gears and front axle halves 108 and 110. Front drive wheels 112 and 114 are rotatively connected to the front axle halves in a conventional manner.

Bevel pinion 90 attached to the end of rear drive shaft 86 drives a similar drive train arrangement to the rear wheels 116 and 118. Roller clutches 124 and 126 operatively connect the rear drive axle halves 120 and 122 to respective spur gears 128 and 130. Spur pinions 132 and 134 on idler shaft 136, together with bevel gear 138, connect spur gears 128 and 130 to bevel pinion 90.

The respective bevel and spur gear pairs which connect the drive shafts to the drive axle halves may be arranged to provide either a single or two-stage speed reduction to the axle halves. However, in FIG. 6, the bevel gears are depicted as miter gears, and the speed reductions are accomplished by the respective pairs of spur gears. The roller clutches depicted in FIG. 6 may be of the type disclosed in copending U.S. patent application Ser. No. 357,407 filed on May 26, 1989 now U.S. Pat. No. 4,958,533. The disclosure of that application is hereby incorporated by reference. Preferably, the transmission that is described in the incorporated application is also used in our present drive line to interconnect the front and rear drive shafts 84 and 86 to a source of motive power.

Although the roller clutches of FIG. 6 are shown operatively connecting spur gears to respective axle halves, the spur gears may also be considered a part of the front or rear drive axles. Accordingly, the roller clutches of FIG. 6, like the roller clutches of FIG. 1, may be considered to operatively connect respective drive wheels to the front and rear axles.

In both of FIGS. 1 and 6, the two front roller clutches perform the two-fold function of permitting relative rotation between the two front drive wheels and between the front and rear drive axles. The two rear roller clutches permit relative rotation between the two rear drive wheels. Accordingly, the two front roller clutches may be used alone to selectively engage the front drive wheels, and the rear roller clutches may be replaced by a conventional or limited slip differential. However, if the rear roller clutches are so replaced, the reduction in speed to the front drive axle should be adjusted to compensate for the change in effective rotational speed of the rear drive axle. That is, the rear roller clutches provide for rotating the rear drive axle at the same speed as the slower rotating rear drive wheel, whereas a differential mechanism provides for rotating a differential housing portion of the rear drive axle at the average speed of the two rear drive wheels.

Figure 7:
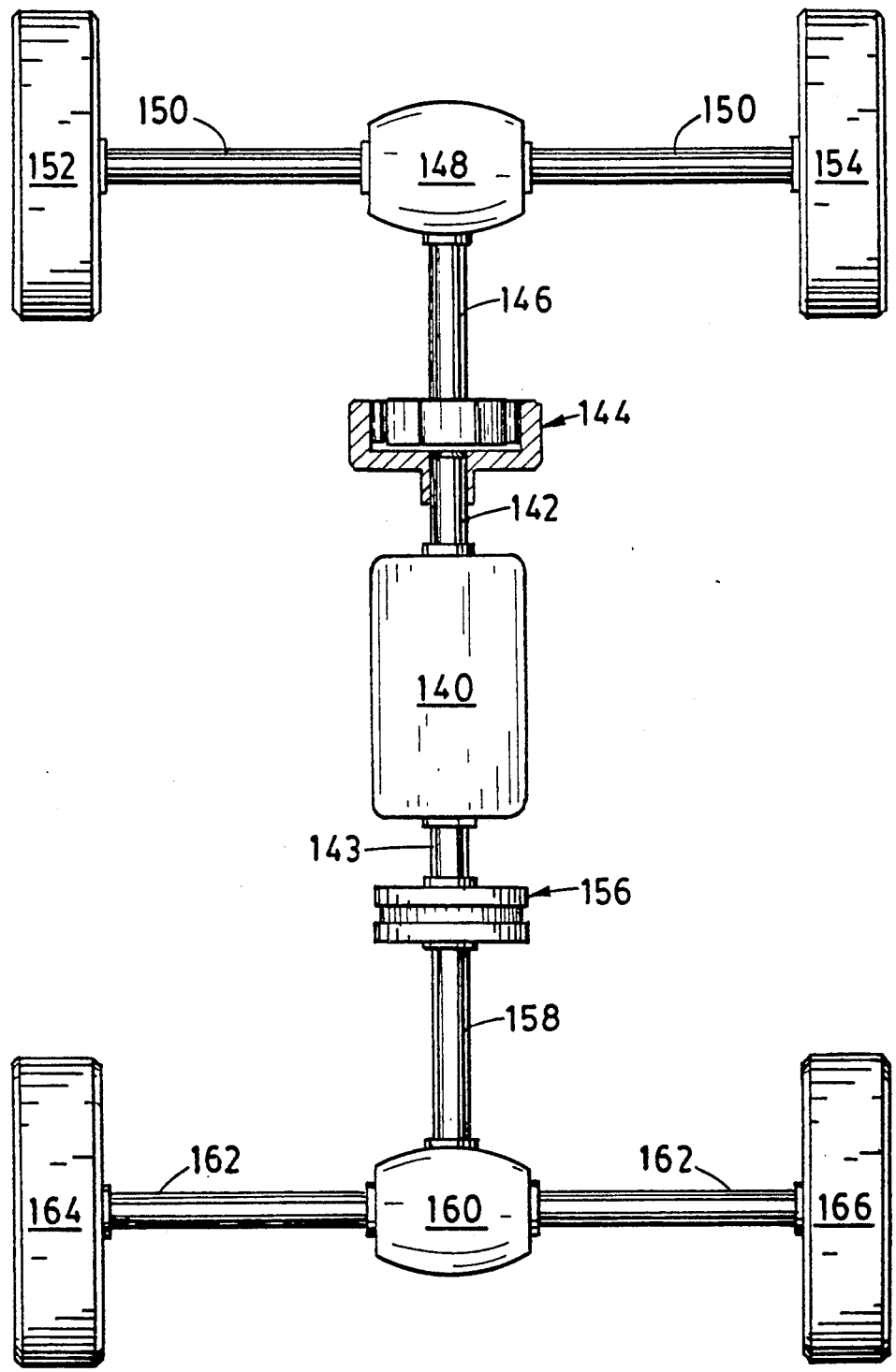
FIG. 7 is a schematic layout of an alternative embodiment of our part-time all wheel drive system including only a single roller clutch for achieving the interaxle functions of two front roller clutches of the preceding embodiment.

Another embodiment of our part-time all wheel drive system is schematically depicted in FIG. 7. Transmission 140 includes front and rear output shafts 142 and 143. Output shaft 142 is operatively connected to front drive shaft 146 by overrunning clutch 144. The front drive shaft 146 is connected to front axle 150 by speed adjuster 148. Front drive wheels 152 and 154 are connected to the front drive shaft in the usual manner. Included with speed adjuster 148 may be a conventional differential mechanism which divides the front axle into two halves and which permits relative rotation between the halves.

A compliant coupling 156 interconnects rear transmission output shaft 143 with rear drive shaft 158. The remaining portion of the drive train to the rear drive wheels 164 and 166 includes rear speed adjuster 160 and rear drive axle 162. Similar to the front speed adjuster 148, the rear speed adjuster 160 may also include a conventional differential. However, the two speed adjusters 148 and 160 are arranged so that the relative rotational speed transmitted to the front drive axle is slower than the relative rotational speed transmitted to the rear axle.

The overrunning clutch 144 may be a two-way roller clutch of the type illustrated in FIGS. 2 through 5 which is biased into one limit position and is indexed by an external actuator to the other limit position, or may be of the type disclosed in the incorporated application which is indexed by an external actuator to both limit positions. It would also be possible to do away with the external actuator altogether by arranging the roller clutch in a manner such that a small amount of frictional resistance to the rotational motion of the roller retainer is used to automatically index the roller clutch to an appropriate limit position. More importantly, the overrunning clutch or other similar mechanism is arranged to permit the drive shaft 146 to rotate faster than transmission output shaft 142 when power is being delivered to the rear drive wheels, but also permits delivery of power to the front drive wheels when transmission output shaft 142 is rotated at a speed which contributes further rotation to front drive shaft 146.

The compliant coupling 156 performs the same function as the coupling 80 included with the embodiment of FIG. 1. The coupling initially compensates for the differing rotational speeds transmitted to the front and rear axles by reducing the amount of rotation transmitted to the rear axle. However, the coupling does not delay the initial transmission of power to the drive wheels. Any portion of the drive power that does not initially reach the rear drive wheels is immediately communicated to the front drive wheels to help propel the vehicle. Once the vehicle is in motion, the drive power to the front drive wheels is relieved by the further rotation of the front drive wheels until the the front drive shaft is disengaged and drive power is transmitted exclusively to the rear drive wheels. The amount of coupling compliance is also limited so that at appreciable vehicle speeds, the amount of relative rotation permitted between the rear output shaft of the transmission and the rear drive shaft is less than the relative rotation between the front output shaft and front drive shaft. Accordingly, the front axle remains disengaged during periods of vehicle acceleration at higher vehicle speeds.

Although our part-time all wheel drive system is more importantly arranged to permit the drive wheels to rotate out of engagement with a drive train to them, it is also possible to appropriately index the roller clutches to permit the vehicle's engine to help brake the vehicle. For example, during periods of vehicle deceleration, it would be possible to index the roller retainers to an opposite limit position which would connect the faster rotating drive wheels to the slower rotating drive train. Although it is preferred to set up our all wheel drive system to normally drive only the rear drive wheels, it would also be possible to normally drive only the front wheels and to engage the rear wheels only when increased traction is desired. Finally, instead of using different gear ratios to transmit different relative speeds between the front and rear axles, it is also possible to use equal gear ratios to effect the different relative speeds by varying the respective diameters of the front and rear drive wheels. These and other variations will be apparent to those of skill in the art within the spirit and scope of the teaching of our invention as set forth in the appended claims.

We claim:

1. An all wheel drive system for a motor vehicle drive line comprising:
    a first drive axle of a drive line rotatively supporting a first pair of drive wheels;
    a second drive axle of said drive line rotatively supporting a second pair of drive wheels;
    a drive shaft of said drive line for delivering power from an engine to said first and second drive axles;
    a first speed adjuster of said drive line rotatively connecting said drive shaft to said first drive axle;
    a second speed adjuster of said drive line rotatively connecting said drive shaft to said second drive axle;
    said first speed adjuster providing for transmitting a slower relative rotational speed from said drive shaft to said first drive axle than a relative rotational speed transmitted from said drive shaft to said second drive axle by said second speed adjuster;
    at least one overrunning clutch operatively connected to said drive line for permitting at least one of said first pair of drive wheels to rotate faster than otherwise rotated by said drive line;
    said drive shaft providing for delivering engine power to at least one of said second pair drive wheels;
    said overrunning clutch providing for delivering engine power to said one drive wheel of the first pair of drive wheels when said one drive wheel of the first pair of drive wheels is not being rotated any faster than otherwise rotated by said drive line;
    a first pair of overrunning clutches providing for respectively connecting each drive wheel of said first pair of drive wheels to said first drive axle;
    said first pair of overrunning clutches permitting both drive wheels of said first pair of drive wheels to rotate faster than said first drive axle; and
    a second pair of overrunning clutches providing for respectively connecting each drive wheel of said second pair of drive wheels to said second drive axle.

2. The all wheel drive system of claim 1 wherein said second pair of overrunning clutches permits either one of said drive wheels of said second pair of drive wheels to rotate faster than said second drive axle.

3. The all wheel drive system of claim 2 wherein each of said overrunning clutches is engageable for rotatively coupling said respective drive wheels to said respective drive axles and is disengageable for permitting relative rotation between said respective drive wheels and drive axles.

4. The all wheel drive system of claim 3 wherein each of said overrunning clutches is defined as a two-way roller clutch including a camming member having a plurality of recesses formed in its peripheral surface and a roller retainer circumferentially supporting a plurality of rollers within respective recesses in said camming member.

5. The all wheel drive system of claim 4 wherein said roller retainers together with said plurality of rollers are indexable between two limit positions within said recesses, one of said limit positions enabling engagement of said two-way roller clutches in response to one direction of relative rotation between said respective drive wheels and drive axles and the other of said limit positions enabling engagement of said two-way roller clutches in response to an opposite direction of relative rotation between said respective drive wheels and drive axles.

6. The all wheel drive system of claim 5 wherein separate resilient means are used to urge said roller retainers into said one limit position enabling engagement of said two-way roller clutches in response to forward drive rotation of said drive axles with respect to said drive wheels and enabling disengagement of said two-way roller clutches in response to forward rotation of said drive wheels with respect to said drive axles.

7. The all wheel drive system of claim 6 wherein an externally controlled actuator is connected to each of said two-way roller clutches for indexing said roller retainers together with said plurality of rollers to said other limit position enabling engagement of said two-way roller clutches in response to reverse drive rotation of said drive axles with respect to said drive wheels and enabling disengagement of said two-way roller clutches in response to reverse rotation of said drive wheels with respect to said drive axles.

8. The all wheel drive system of claim 7 wherein said externally controlled actuator includes an annular plate rotatively coupled to said roller retainer, said annular plate having angularly spaced vanes in communication with a fluid supply duct of a stationary hydraulic control housing for communicating a supply of pressurized fluid against said vanes for indexing said roller retainer to said other limit position.

9. An all wheel drive system for a motor vehicle drive line comprising:

a first drive axle of a drive line rotatively supporting a first pair of drive wheels;

a second drive axle of said drive line rotatively supporting a second pair of drive wheels;

a drive shaft of said drive line for delivering power from an engine to said first and second drive axles;

a first speed adjuster of said drive line rotatively connecting said drive shaft to said first drive axle;

a second speed adjuster of said drive line rotatively connecting said drive shaft to said second drive axle;

said first speed adjuster providing for transmitting a slower relative rotational speed from said drive shaft to said first drive axle than a relative rotational speed transmitted from said drive shaft to said second drive axle by said second speed adjuster;

at least one overrunning clutch operatively connected to said drive line for permitting at least one of said first pair of drive wheels to rotate faster than otherwise rotated by said drive line;

said drive shaft providing for delivering engine power to at least one of said second pair drive wheels;

said overrunning clutch providing for delivering engine power to said one drive wheel of the first pair of drive wheels when said one drive wheel of the first pair of drive wheels is not being rotated any faster than otherwise rotated by said drive line;

said drive shaft divided into two halves, a first half of said drive shaft rotatively connecting said first drive axle to a transmission output shaft and a second half of said drive shaft rotatively connecting said second drive axle to said transmission output shaft;

said overrunning clutch providing for rotatively connecting said transmission output shaft to said first drive shaft half;

said overrunning clutch being engageable for rotatively coupling said transmission output shaft to said first drive shaft half and being disengageable for permitting relative rotation between said transmission output shaft and said first drive shaft half;

said overrunning clutch permitting said first drive shaft half to rotate faster than said transmission output shaft;

said overrunning clutch being defined as a two-way roller clutch including a camming member having a plurality of recesses formed in its peripheral surface and a roller retainer circumferentially supporting a plurality of rollers within respective recesses in said camming member;

said roller retainer together with said plurality of rollers being indexable between two limit positions within said recesses, one of said limit positions enabling engagement of said two-way roller clutch in response to one direction of relative rotation between said transmission output shaft and said first drive shaft half and the other of said limit positions enabling engagement of said two-way roller clutch in response to an opposite direction of relative rotation between said transmission output shaft and said first drive shaft half;

a resilient means being used to urge said roller retainers into said one limit position enabling engagement of said two-way roller clutch in response to forward drive rotation of said transmission output shaft with respect to said first drive shaft half and enabling disengagement of said two-way roller clutch in response to forward rotation of said first drive shaft half with respect to said transmission output shaft; and an externally controlled actuator being connectable to said two-way roller clutch for indexing said roller retainer together with said plurality of rollers to said other limit position enabling engagement of said two-way roller clutch in response to reverse drive rotation of said transmission output shaft with respect to said first drive shaft half and enabling disengagement of said two-way roller clutch in response to reverse rotation of said first drive shaft half with respect to said transmission output shaft.

10. The all wheel drive system of claim 9 wherein said externally controlled actuator includes an annular plate rotatively coupled to said roller retainer, said annular plate having angularly spaced vanes in communication with a fluid supply duct of a stationary hydraulic control housing for communicating a supply of pressurized fluid against said vanes for indexing said roller retainer to said other limit position.

11. The all wheel drive system of claim 9 further comprising a compliant coupling for rotatively connecting said transmission output shaft to said second half of said drive shaft.

12. The all wheel drive system of claim 11 wherein an amount of compliance in said coupling is provided so that initial drive power applied to said transmission output shaft is communicated to both of said drive shaft halves until said first drive axle has been rotated by a predetermined amount.

13. A part-time all wheel drive system for a motor vehicle drive line comprising:

a front drive axle of a drive line rotatively supporting a pair of front drive wheels;

a rear drive axle of said drive line rotatively supporting a pair of rear drive wheels;

a drive shaft of said drive line for delivering power from an engine to said front and rear drive axles;

a front speed adjuster of said drive line rotatively connecting said drive shaft to said front drive axle;

a rear speed adjuster of said drive line rotatively connecting said drive shaft to said rear drive axle;

said front speed adjuster providing a different reduction in rotational speed between said drive shaft and said front drive axle than a reduction in speed provided by said rear speed adjuster between said drive shaft and said rear drive axle;

a front pair of two-way roller clutches respectively interposed between said front drive axle and each of said front drive wheels;

a rear pair of two-way roller clutches respectively interposed between said rear drive axle and each of said rear drive wheels;

each of said roller clutches being engageable for rotatively coupling said respective drive wheels to said drive axles and being disengageable for permitting relative rotation between said respective drive wheels and said drive axles; and each of said roller clutches being indexable between two limit positions, one of said limit positions enabling engagement of said roller clutches in response to one direction of relative rotation between said respective drive wheels and said drive axles, and the other of said limit positions enabling engagement of said roller clutches in response to an opposite direction of relative rotation between said respective drive wheels and said drive axles.

14. The part-time all wheel drive system of claim 13 wherein each of said two-way roller clutches includes a camming member having a plurality of recesses formed in its peripheral surface and a roller retainer circumferentially supporting a plurality of rollers within respective recesses in said camming member.

15. The part-time all wheel drive system of claim 14 wherein separate resilient means are used to urge said roller retainers into said one limit position enabling engagement of said roller clutches in response to forward drive rotation of said drive axles with respect to said drive wheels and enabling disengagement of said roller clutches in response to forward rotation of said drive wheels with respect to said drive axles.

16. The part-time all wheel drive system of claim 15 wherein an externally controlled actuator is connected to each of said roller clutches for indexing said roller retainers together with said plurality of rollers to said other limit position enabling engagement of said roller clutches in response to reverse drive rotation of said drive axles with respect to said drive wheels and enabling disengagement of said roller clutches in response to reverse rotation of said drive wheels with respect to said drive axles.

17. The part-time all wheel drive system of claim 16 wherein said externally controlled actuator includes an annular plate rotatively coupled to said roller retainer, said annular plate having angularly spaced vanes in communication with a fluid supply duct of a stationary hydraulic control housing for communicating a supply of pressurized fluid against said vanes for indexing said roller retainer to said other limit position.

18. The part-time all wheel drive system of claim 13 wherein said front speed adjuster provides a reduction in speed to said front drive axle that is larger than a reduction in speed to said rear drive axle through said rear speed adjuster by an amount that exceeds relative rotational effects between said front and rear drive axles caused by ordinary variations in respective wheel diameters between said front and rear pairs of drive wheels.

19. The part-time all wheel drive system of claim 18 wherein said drive shaft is divided into two halves, a front half of said drive shaft rotatively connecting said front drive axle to a transmission output shaft and a rear half of said drive shaft rotatively connecting said rear drive axle to said transmission output shaft.

20. The part-time all wheel drive system of claim 19 further comprising a compliant coupling for rotatively connecting said transmission output shaft to said rear half of said drive shaft.

21. The part-time all wheel drive system of claim 20 wherein an amount of compliance in said coupling is provided so that initial drive power applied to said transmission output shaft is communicated to both of said drive shaft halves until said front drive axle has been rotated by a predetermined amount.

22. A part-time all wheel drive system for a motor vehicle drive line comprising:

a front drive axle of a drive line rotatively supporting a pair of front drive wheels;

a rear drive axle of said drive line rotatively supporting a pair of rear drive wheels;

a drive shaft divided into two halves, a front half of said drive shaft rotatively connected to said front drive axle, and a rear half of said drive shaft rotatively connected to said rear drive axle;

a front speed adjuster of said drive line rotatively connecting said front drive shaft half to said front drive axle;

a rear speed adjuster of said drive line rotatively connecting said rear drive shaft half to said rear drive axle;

said front speed adjuster providing for transmitting a slower relative rotational speed from said front drive shaft half to said front drive axle than a relative rotational speed transmitted from said rear drive shaft half to said rear drive axle by said rear speed adjuster;

an output shaft of a transmission of said drive line for delivering engine power to said front and rear drive shaft halves;

an overrunning clutch interposed between said transmission output shaft and said front drive shaft half, said overrunning clutch being engageable for rotatively coupling said transmission output shaft to said front drive shaft half and being disengageable for permitting relative rotation between said transmission output shaft and said front drive shaft half;

said overrunning clutch permitting said front drive shaft half to rotate faster than said transmission output shaft; and a compliant coupling for rotatively connecting said transmission output shaft to said rear drive shaft half.

23. The part-time all wheel drive system of claim 22 wherein an amount of compliance in said coupling is provided so that initial engine power applied to said transmission output shaft is communicated to both said front and rear drive shaft halves until said front drive axle has been rotated by a predetermined amount.

24. The part-time all wheel drive system of claim 23 wherein said front speed adjuster provides a speed ratio between said front drive shaft half and said front drive axle that is different from a speed ratio provided by said rear speed adjuster between said rear drive shaft half and said rear drive axle by an amount that exceeds relative rotational effects between said front and rear drive axles caused by ordinary variations in respective wheel diameters between said front and rear pairs of drive wheels.

25. The part-time all wheel drive system of claim 24 wherein said overrunning clutch is defined as a two-way roller clutch including a camming member having a plurality of recesses formed in its peripheral surface and a roller retainer circumferentially supporting a plurality of rollers within respective recesses in said camming member.

26. The part-time all wheel drive system of claim 25 wherein said roller retainer together with said plurality of rollers is indexable between two limit positions within said recesses, one of said limit positions enabling engagement of said two-way roller clutch in response to one direction of relative rotation between said transmission output shaft and said front drive shaft half and the other of said limit positions enabling engagement of said two-way roller clutch in response to an opposite direction of relative rotation between said transmission output shaft and said front drive shaft half.

27. A part-time all wheel drive system for a motor vehicle comprising:
- a first drive line connecting a source of motive power with a first pair of drive wheels having a first average diameter;
- a second drive line including a first portion connected to said source of motive power and a second portion connected to at least one of a second pair of drive wheels having a second average diameter;
- an overrunning clutch interposed between said first and second portions of the second drive line, said overrunning clutch being engageable for operatively connecting said first and second portions of the second drive line and being disengageable for permitting relative rotation between said first and second portions of the second drive line;
- said first and second portions of the second drive line being relatively rotatable at a speed ratio effected at least in part by a difference between said first and second diameters of the drive wheels; and
- said overrunning clutch being disengaged by a faster rotation of said second portion with respect to said first portion of the second drive line and being engaged by a faster rotation of said first portion with respect to said second portion of the second drive line.

28. The part-time all wheel drive system of claim 27 in which said first diameter is larger than said second diameter of the drive wheels.

29. The part-time all wheel drive system of claim 28 in which a first gear ratio at which said first pair of drive wheels is connected to said source of motive power is equal to a second gear ratio at which said second pair of drive wheels is connected to said source of motive power.

* * * * *